US012566262B2

(12) United States Patent
Renaud et al.

(10) Patent No.:     US 12,566,262 B2
(45) Date of Patent:          Mar. 3, 2026

(54) VEHICLE ASSEMBLY COMPRISING A RADAR SENSOR AND A GRADIENT-INDEX LENS

(71) Applicant: VALEO VISION, Bobigny (FR)

(72) Inventors: Pierre Renaud, Bobigny (FR); Pierre Albou, Bobigny (FR)

(73) Assignee: Valeo Vision, Bobigny (FR)

( * ) Notice:    Subject to any disclaimer, the term of this patent is extended or adjusted under 35 U.S.C. 154(b) by 312 days.

(21) Appl. No.:    18/254,524

(22) PCT Filed:    Nov. 17, 2021

(86) PCT No.:    PCT/EP2021/082048
§ 371 (c)(1),
(2) Date:    May 25, 2023

(87) PCT Pub. No.: WO2022/117349
PCT Pub. Date: Jun. 9, 2022

(65)           Prior Publication Data
US 2024/0210555 A1      Jun. 27, 2024

(30)       Foreign Application Priority Data

Dec. 1, 2020    (FR) ...................................... 2012491

(51) Int. Cl.
*G01S 13/931*        (2020.01)
*G01S 13/02*         (2006.01)
(52) U.S. Cl.
CPC ........ *G01S 13/931* (2013.01); *G01S 13/0209* (2013.01)

(58) Field of Classification Search
CPC .... G01S 13/931; G01S 13/0209; G01S 7/027; G01S 2013/93277; H01Q 1/3233; H01Q 1/3291; H01Q 1/422; H01Q 19/06
See application file for complete search history.

(56)           References Cited

U.S. PATENT DOCUMENTS 5,389,939 A  *  2/1995  Tang ........................ H01Q 5/42
                                                              343/753
5,675,349 A     10/1997  Wong
                 (Continued)

FOREIGN PATENT DOCUMENTS

CN          111279211 A       6/2020
DE      102011115829 A1      4/2013
                 (Continued)

OTHER PUBLICATIONS

Relative Permittivity and Refractive Index.pdf (Year: 2008).*
(Continued)

*Primary Examiner* — Vladimir Magloire
*Assistant Examiner* — Yonghong Li
(74) *Attorney, Agent, or Firm* — Valeo Vision

(57)           ABSTRACT
The invention relates to a vehicle assembly for a vehicle, the vehicle assembly including a radar sensor having a field of vision and configured to transmit radar waves over a range of wavelengths in the field of vision, and a lens arranged opposite the radar sensor, with the lens being a gradient-index lens and includes a sublayer and a layer of patterns forming a subwavelength-structured dielectric element with a repetition period of the patterns that is less than quarter of a wavelength of the range, and the layer of patterns has a local refractive index which is calculated as a function of a local density of the patterns in the layer.

11 Claims, 3 Drawing Sheets

(56)    References Cited

U.S. PATENT DOCUMENTS

| | | | | |
|---|---|---|---|---|
| 6,496,138 | B1 | 12/2002 | Honma | |
| 7,075,496 | B2 | 7/2006 | Hidai et al. | |
| 7,724,180 | B2* | 5/2010 | Yonak | H01Q 25/002 |
| | | | | 343/753 |
| 8,963,787 | B2 | 2/2015 | Lee-Bouhours et al. | |
| 10,754,026 | B2 | 8/2020 | Callewaert | |
| 11,362,433 | B2 | 6/2022 | Loesch et al. | |
| 2003/0052810 | A1* | 3/2003 | Artis | H01Q 1/44 |
| | | | | 343/872 |
| 2010/0066639 | A1* | 3/2010 | Ngyuen | H01Q 15/08 |
| | | | | 343/911 R |
| 2014/0263982 | A1* | 9/2014 | Shkunov | G02B 3/0056 |
| | | | | 216/26 |
| 2017/0207514 | A1* | 7/2017 | Kamo | B32B 7/05 |

FOREIGN PATENT DOCUMENTS

| | | | |
|---|---|---|---|
| EP | 2573872 | A1 | 3/2013 |
| EP | 3644087 | A1 | 4/2020 |
| FR | 2975506 | A1 | 11/2012 |
| JP | H09222506 | A | 8/1997 |
| KR | 20050029710 | A | 3/2005 |

OTHER PUBLICATIONS

Z. Qamar, N. Aboserwal and J. L. Salazar-Cerreno, "An Accurate Method for Designing, Characterizing, and Testing a Multi-Layer Radome for mm-Wave Applications," in IEEE Access, vol. 8, pp. 23041-23053, 2020, doi: 10.1109/ACCESS.2020.2970544 (Year: 2020).*

European Patent Office, International Search Report (with English translation) and Written Opinion of corresponding International Application No. PCT/EP2021/082048, dated Feb. 24, 2022.

Korea Patent Office, Office Action (with English translation) and of corresponding Korean Application No. 2023-7022290, dated Mar. 26, 2025, 11 pages.

Japan Patent Office, Search Report (with English translation) and of corresponding Japanese Application No. 2023-533383, dated Jun. 21, 2024, 43 pages.

China Patent Office, Office Action (with English translation) of corresponding Chinese Patent Application No. 202180080487.7, dated Aug. 16, 2025, 19 pages.

* cited by examiner

VEHICLE ASSEMBLY COMPRISING A RADAR SENSOR AND A GRADIENT-INDEX LENS

TECHNICAL FIELD

The present invention relates to a vehicle assembly. It is particularly but non-limitingly applicable to motor vehicles.

BACKGROUND OF THE INVENTION

A vehicle assembly known to those skilled in the art comprises:
a radar sensor having a field of view and configured to transmit radar waves in a range of wavelengths into said field of view, and
a lens placed facing said radar sensor.
This vehicle assembly is placed at the front or at the rear of the vehicle, in order to meet needs in respect of detection, by the radar sensor, of objects in the environment outside the vehicle. The lens is curved to adapt the field of view of the radar sensor. Specifically, it makes it possible to enlarge or reduce the field of view of the radar sensor. For example, it reduces the field of view of the radar sensor to increase its range, or it enlarges its field of view to achieve wider detection of objects to the sides of the vehicle. The lens thus makes it possible to adjust the field of view of the radar sensor depending on the demands of manufacturers.
One disadvantage of the prior art is that such a curved lens takes up space and is heavy and expensive. In addition, the material of the lens absorbs some of the radar waves transmitted by the radar sensor, this reducing the detection performance of the radar sensor. This thus decreases the detection range of the radar sensor. Consequently, detection errors or non-detection of an object even though the latter is present in the environment outside the vehicle may occur.

SUMMARY OF THE INVENTION

This context, the present invention aims to provide a vehicle assembly allowing the mentioned drawback to be solved.
To this end, the invention provides a vehicle assembly for a vehicle, said vehicle assembly comprising:
a radar sensor having a field of view and configured to transmit radar waves in a range of wavelengths into said field of view, and
a lens placed facing said radar sensor,
characterized in that said lens is a gradient-index lens and comprises an underlayer and a layer of patterns forming a sub-wavelength structured dielectric element, a repetition period of the patterns being less than one quarter of a wavelength of said range, and characterized in that the layer of patterns possesses a local refractive index that is calculated depending on a local density of said patterns in said layer.
According to non-limiting embodiments, said vehicle assembly may further comprise, alone or in any technically possible combination, one or more additional patterns selected from the following.
According to one non-limiting embodiment, said radar sensor is a radar sensor employing millimeter waves or hyperfrequency waves or microwaves.
According to one non-limiting embodiment, said radar waves are transmitted in a frequency band comprised between 100 MHz and 5 GHz.

According to one non-limiting embodiment, said repetition period of the patterns is less than one tenth of said wavelength.
According to one non-limiting embodiment, the lens is composed of unit cells each comprising one pattern and the local density of said patterns in said layer at a given point of the lens is equal to the weighted average of all of the fill factors obtained for each unit cell located at a distance from the point in question on the lens smaller than a given value of the order of one of the wavelengths of the range of wavelengths used.
According to one non-limiting embodiment, the fill factor of each unit cell is equal to a volume of material in said unit cell divided by the repetition period of said patterns times a maximum height in the pattern of said unit cell.
According to one non-limiting embodiment, the local density is equal to the width times the length of a pattern divided by the repetition period of said patterns. This is valid for a cubic or rectangular pattern.
According to one non-limiting embodiment, the local refractive index is composed of two effective refractive indices dependent on said local density and on the permittivity of the patterns and on the permittivity of air.
According to one non-limiting embodiment, said patterns are cylindrical prisms, or rectangular prisms, or pyramidal prisms, or cubic prisms, or segments of tori.
According to one non-limiting embodiment, a pattern has dimensions less than 0.4 mm.
According to one non-limiting embodiment, said lens has a total thickness formed by the height of said patterns and by the thickness of said underlayer, said total thickness being dimensioned so that it is equal to m times said wavelength divided by twice the equivalent refractive index of the layer of patterns and of the underlayer times the cosine of a refracted angle corresponding to an angle of incidence of the radar waves, with m an integer.
According to one non-limiting embodiment, if the angle of incidence is equal to zero, then the total thickness is equal to said wavelength divided by twice the equivalent refractive index.
According to one non-limiting embodiment, the total thickness is defined with an angle of incidence equal to $\arctan(d1/(2e4))$, with e4 the distance between said radar sensor and said lens and d1 the distance between a transmit antenna and receive antennas of said radar sensor.
A lens is further provided, said lens being configured to adapt a field of view of a radar sensor of a vehicle configured to transmit radar waves, said lens being placed facing said radar sensor, characterized in that:
said lens is a gradient-index lens and comprises an underlayer and a layer of patterns forming a sub-wavelength structured dielectric element, a repetition period of the patterns being less than one quarter of one wavelength of a range of wavelengths in which said radar waves are transmitted, and the layer of patterns of which possesses a local refractive index that is calculated depending on a local density of said patterns in said layer.

BRIEF DESCRIPTION OF DRAWINGS

The invention and its various applications will be better understood on reading the description that follows and on studying the figures which accompany it.

DETAILED DESCRIPTION OF THE INVENTION

Unless otherwise indicated, elements that are identical in structure or function and that appear in more than one figure have been designated by the same references in all the figures in which they appear.

The vehicle assembly 1 for a vehicle 2 according to the invention is described with reference to FIGS. 1 to 4. The vehicle assembly 1 is also referred to as the vehicle system 1. In one non-limiting embodiment, the vehicle 2 is a motor vehicle. By motor vehicle, what is meant is any type of motorized vehicle. This embodiment is taken as a non-limiting example throughout the remainder of the description. In the remainder of the description, the vehicle 2 is thus also called the motor vehicle 2. In one non-limiting embodiment, the vehicle assembly 1 is placed behind a logo integrated into the grille of the motor vehicle 2 or into a body part located at the rear of the motor vehicle 2. In another non-limiting embodiment, the vehicle assembly 1 is placed in a lighting device or a signaling device.

Figure 1:
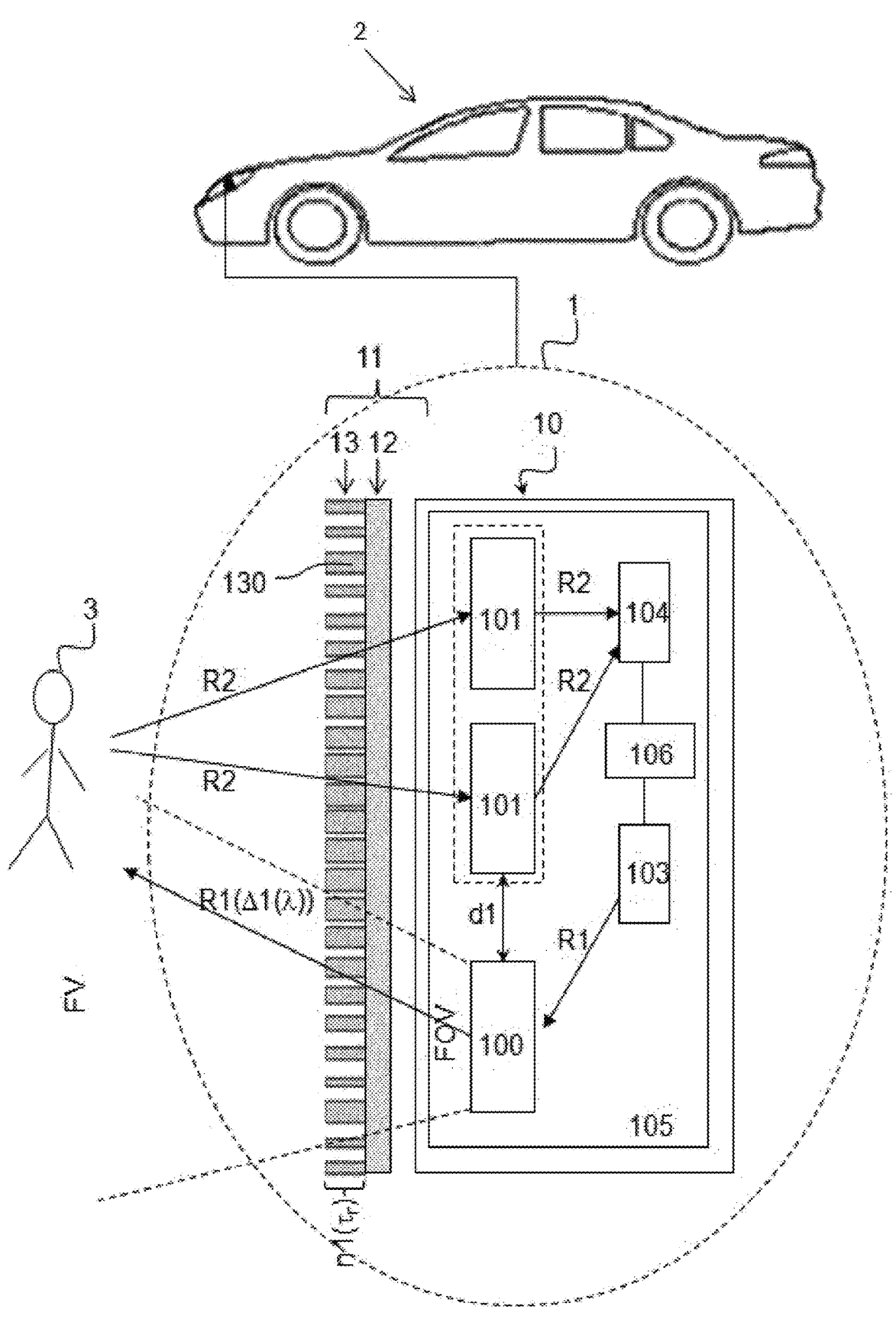
FIG. 1 is a schematic view of a vehicle assembly, said vehicle assembly comprising a radar sensor and a lens, according to one non-limiting embodiment of the invention.

As illustrated in FIG. 1, the vehicle assembly 1, which is also referred to as the vehicle arrangement 1, comprises:

- a radar sensor 10 having a field of view FOV and configured to transmit radar waves R1, also called primary radar waves R1, into said field of view FOV, and—a lens 11 placed facing said radar sensor 10.

These elements are described below.

The radar sensor 10 is described below. As illustrated in FIG. 1, the radar sensor 10 is placed facing the lens 11. In one non-limiting embodiment, the radar sensor 10 is a radar sensor employing millimeter waves (waves between 24 GHz and 300 GHz) or hyperfrequency waves (waves between 300 MHz and 81 GHz) or microwaves (waves between 1 GHz and 300 GHz). In one non-limiting variant of embodiment, the radar sensor 10 operates at a radar frequency comprised between 76 GHz and 81 GHz. The radar waves R1 are transmitted in a range $\Delta 1$ of wavelengths A. In one non-limiting embodiment, the radar waves R1 are transmitted in a frequency band comprised between 100 MHz and 5 GHz. Thus, in one non-limiting example, if the sensor operates at a radar frequency of 77 GHz, i.e. at a wavelength $\lambda$ of 3.95 mm, with a frequency band of 1 GHz, the radar sensor 10 will operate in a frequency band from 76.5 GHz to 77.5 GHz. The radar waves R1 will thus be transmitted in the frequency range 76.5 GHz to 77.5 GHz, i.e. a range $\Delta 1$ of wavelengths $\lambda$ from 3.87 mm to 3.92 mm. Thus, in one other non-limiting example, if the radar sensor 10 operates at a radar frequency of 78.5 GHz with a frequency band of 5 GHZ, the radar sensor 10 will operate in a frequency band from 76 GHz to 81 GHZ. The radar waves R1 will thus be transmitted in the frequency range 76 GHz to 81 GHz, i.e. a range $\Delta 1$ of wavelengths $\lambda$ from 3.701 mm to 3.945 mm.

Figure 2:
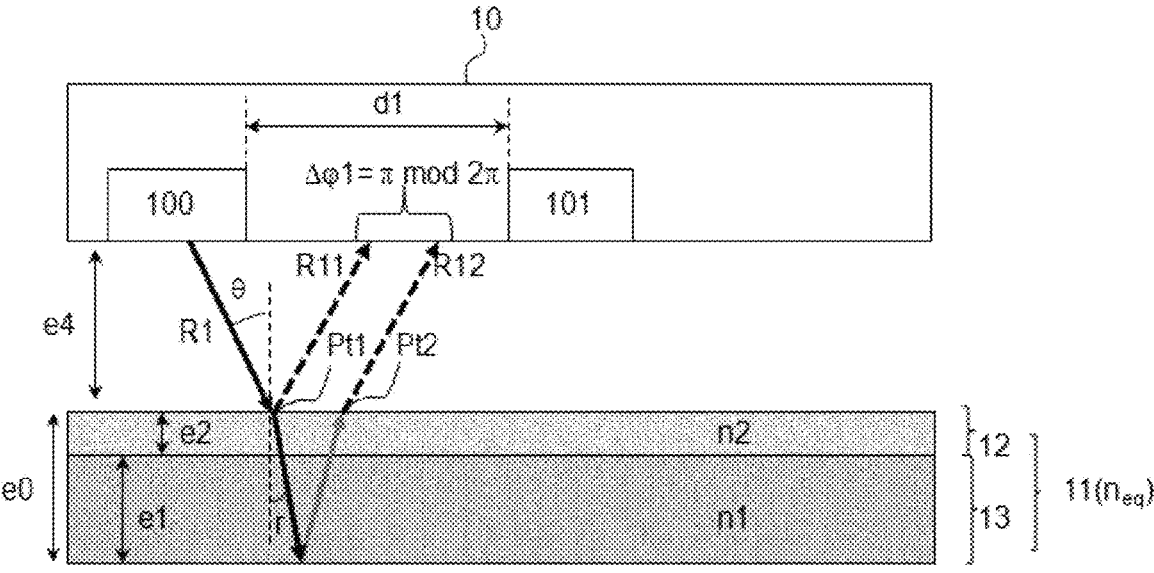
FIG. 2 is a schematic view of a radar wave transmitted by the radar sensor of the vehicle assembly of FIG. 1 and partially reflected by the lens of the vehicle assembly of FIG. 1, according to one non-limiting embodiment.

As illustrated in FIG. 2, the transmitted radar waves R1 strike the lens 11 with an angle of incidence $\theta$. In one non-limiting embodiment, the angle of incidence $\theta$ is comprised between 0° and +/−30°. The field of view FOV thus varies between −30° and +30°. The center of the field of view FOV is at an angle of 0° with respect to the longitudinal axis of the vehicle, also called the axis of the vehicle. In another non-limiting embodiment, the field of view FOV varies between −90° and +45°. The center of the field of view FOV is at an angle of −45° with respect to the axis of the vehicle and the angle of incidence $\theta$ of the radar waves R1 on the lens 11 remain close to 0° (the vehicle assembly 1 then being positioned at about 45° to the axis of the vehicle).

The radar sensor 10 is configured to scan the environment outside the motor vehicle 2, by virtue of transmission of radar waves R1. As illustrated in FIG. 1, the radar sensor 10 thus comprises:

- at least one transmit antenna 100 configured to transmit radar waves R1, also called primary radar waves R1,
- at least two receive antennas 101 configured to receive radar waves R2, also called secondary radar waves R2 or return radar waves R2.

The radar sensor 10 further comprises at least one transmitter 103 configured to generate the primary radar waves R1 and at least one receiver 104 configured to process secondary radar waves R2 received in return. In one non-limiting embodiment, a single electronic component may be used for both the transmission function and the reception function. There will thus be one or more transceivers. Said transmitter 103 generates primary radar waves R1, which are subsequently transmitted by the transmit antenna 100, and which, when they encounter an object 3 (here a pedestrian in the non-limiting example illustrated) in the environment outside the motor vehicle 2, reflect from said object 3. The radar waves thus reflected are waves that are transmitted back to the radar sensor 10. These are the secondary radar waves R2 received by the receive antennas 101. These are radar waves retransmitted in the direction of the radar sensor 10. In one non-limiting embodiment, the primary radar waves R1 and the secondary radar waves R2 are radiofrequency waves. In one non-limiting embodiment, the radar sensor 10 comprises a plurality of transmitters 103 and a plurality of receivers 104.

The transmit antenna 100, also referred to as the antenna 100, is configured to transmit the primary radar waves R1 generated by the transmitter 103. The receive antennas 101, also referred to as the antennas 101, are configured to receive the secondary radar waves R2 and communicate them to the receiver 104, which subsequently processes them. There is a phase shift between the secondary radar waves R2 received by the receive antennas 101, which allows the angular position of the object 3 with respect to the motor vehicle 2 to be deduced, said object 3 being located in the environment outside of the motor vehicle 2. In non-limiting embodiments, the antennas 100, 101 are patch antennas or slot antennas.

In one non-limiting embodiment, the antennas 100, 101, the transmitter 103 and the receiver 104 are placed on a printed circuit board 105. In one non-limiting embodiment, the printed circuit board is a rigid printed circuit board, a.k.a. a printed circuit board assembly or PCBA, or a flexible printed circuit board, a.k.a. a flex board.

The radar sensor 10 further comprises an electronic control unit 106 configured to control the transmitter 103 and the receiver 104. Since such a radar sensor is known to those skilled in the art, it is not described in more detail here.

The lens 11 is described below. The lens 11 is a gradient-index lens. In other words, the lens 11 is flat and possesses an equivalent refractive index $n_{eq}$ at the scale of the wavelengths $\lambda$ of the range $\Delta 1$ of wavelengths. It is variable on the scale of said wavelengths A due to the refractive index n1 (of the layer 13) being variable, the refractive index n2 (of the underlayer 12) being constant.

The lens 11 makes it possible to adapt the field of view FV of the vehicle assembly 1 by varying the equivalent refractive index $n_{eq}$ accordingly by means of the density of the patterns 130 (described below) and their size. A vehicle assembly 1 having a field of view FV different from the field of view FOV of the radar sensor 10 is thus obtained. It is thus in particular possible to obtain a wide field of view FV using a long-range radar sensor 10 (reduced field of view FOV) or a reduced field of view FV using a short-range radar sensor 10 (large field of view FOV), depending on the demands of manufacturers. The lens 11 is placed between the radar sensor 10 and the exterior of the motor vehicle 2.

Figure 3:
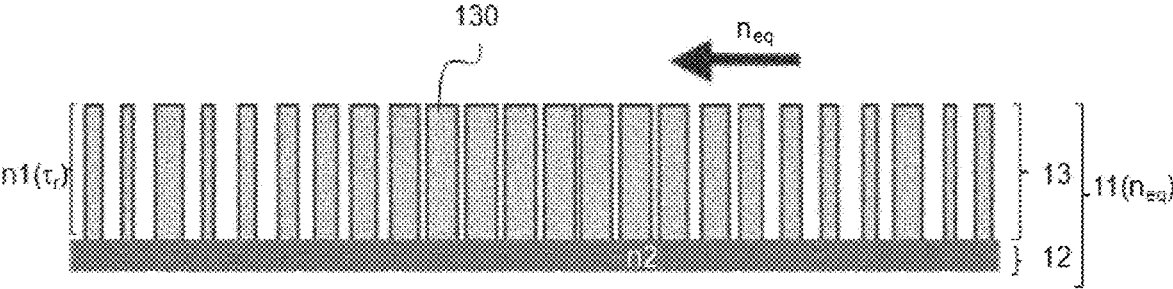
FIG. 3 is a schematic view of the lens of the vehicle assembly of FIG. 1, said lens comprising an underlayer and a layer of patterns, according to one non-limiting embodiment.

As illustrated in FIGS. 2 and 3, the lens 11 comprises an underlayer 12 and a layer 13 of patterns 130. The underlayer 12 is configured to hold the layer 13 of patterns 130. It possesses a refractive index n2. In non-limiting embodiments, the underlayer 12 is made of plastic, glass or ceramic. In one non-limiting example, the plastic is polycarbonate. The layer 13 of patterns 130 forms a sub-wavelength structured dielectric element. It possesses a refractive index n1 that is dependent on the patterns 130 and on their spacing, which is also called the local refractive index n1. In non-limiting embodiments, the dielectric element is made of plastic, glass or ceramic. In one non-limiting example, the plastic is polycarbonate. It will be recalled that a dielectric is non-conductive and therefore lets the radar waves R1 pass, unlike a conductor.

By structured, what is meant is that the layer 13 comprises patterns 130, these also being called structures. By sub-wavelength, what is meant is that the structured dielectric is on a scale smaller than the wavelengths $\lambda$ of said range $\Delta 1$. The fact that the patterns 130 of the layer 13 are sub-wavelength allows this layer 13 to be modeled as a variable-index layer. In the contrary case, the layer 13 would have to be considered to be a diffractive optical element.

Figure 4:
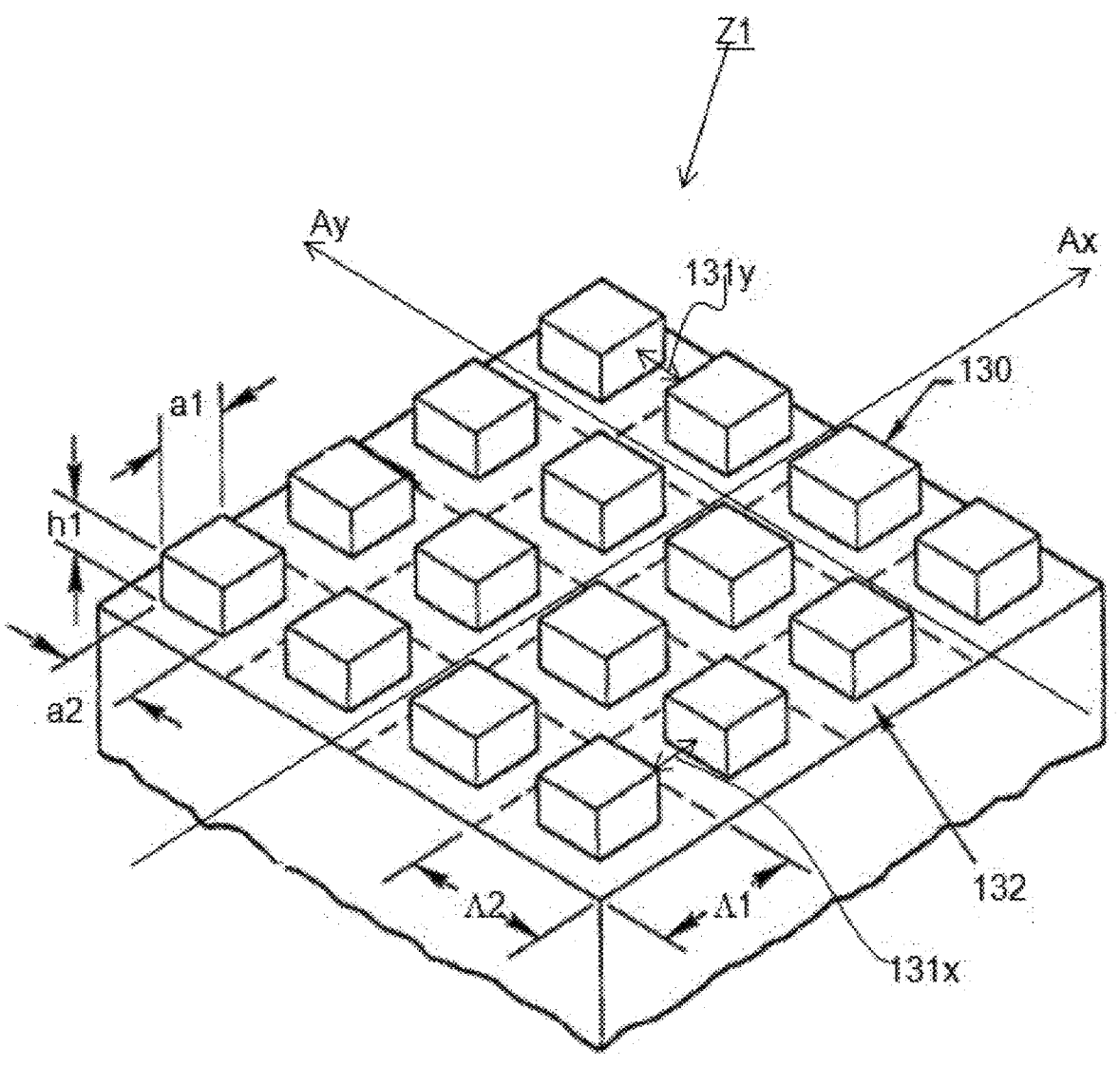
FIG. 4 is a perspective view of a local region of the patterns of the layer of patterns of the lens of FIG. 3, according to one non-limiting embodiment of the invention.

As illustrated in FIG. 4, which is a view of a local region Z1 of the patterns 130 of the layer 13, the patterns 130 have dimensions a1 (width), a2 (width), h1 (height). In non-limiting embodiments, the patterns 130 are cylindrical prisms (also called cylindrical pillars), or rectangular prisms (also called rectangular pillars), or pyramidal prisms (also called pyramid pillars), or cubic prisms (also called square pillars)—the latter case being illustrated in FIG. 4—or even segments of tori. They may also have any other parallelepiped shape. In one non-limiting embodiment, a pattern 130 has dimensions a1, a2 less than 0.4 mm. This value is very small compared to the wavelengths $\lambda$ of said range $\Delta 1$. For example a wavelength $\lambda$ of said range $\Delta 1$ is 4 mm for a frequency of 77 GHz; in this case, the value of a1, a2 is about equal to $\lambda / 10$.

As illustrated in FIG. 4, the lens 11 is composed of unit cells 132 each comprising one pattern 130 and an air-filled segment encircling said pattern 130. In one non-limiting embodiment variant (not illustrated), the patterns 130 are contiguous (they adjoin) on the boundary surface between the layer 13 and the underlayer 12. This non-limiting variant is applicable for patterns 130 that in shape are pyramidal or a segment of a torus. The unit cell 132 is defined by the repetition period $\Lambda$ of the structures 130, also called the repetition period $\Lambda$ of the patterns 130 or even the grating period $\Lambda$, with $\Lambda = \Lambda 1 \times \Lambda 2$. $\Lambda 1$ is the period of the grating in a first direction Ax (illustrated in FIG. 4), and $\Lambda 2$ is the period of the grating in a second direction Ay (illustrated in FIG. 4). Ax and Ay are arbitrary directions that are not parallel to each other. In one non-limiting embodiment, the second direction Ay is perpendicular to the first direction Ax. In another non-limiting example, the unit cell 132 is a square, a hexagon, a parallelogram, or any other shape that allows the boundary surface between the layer 13 and the underlayer 12 to be tiled periodically. A third direction perpendicular to the first direction Ax and to the second direction Ay will be denoted Az, these directions together forming a reference frame Ax, Ay, Az.

In a first non-limiting embodiment, the sub-wavelength structured dielectric element forming the layer 13 is a periodic sub-wavelength structured dielectric element. The dimensions a1, a2 of the patterns 130 change along the layer 13 so as to vary the refractive index of the lens 1, whereas $\Lambda 1$ and $\Lambda 2$ remain constant. In other words, the patterns 130 are identically spaced from one another in a first direction Ax (illustrated in FIG. 4) and are identically spaced in a second direction Ay (illustrated in FIG. 4) perpendicular to the first direction Ax. In other words, the layer 13 has identical spacings 131$x$ in the first direction Ax, and identical spacings 131$y$ in the second direction Ay (as illustrated in FIG. 4) between the patterns 130, or in other words there is the same proportion of air between the patterns 130.

In another non-limiting embodiment (illustrated in FIG. 3), the sub-wavelength structured dielectric element forming the layer 13 is not periodic. $\Lambda 1$ and $\Lambda 2$ change along the layer 13 so as to vary the refractive index of the lens 1, whereas the dimensions a1, a2 of the patterns 130 remain constant. The layer 13 comprises variable spacings 131$x$, 131$y$ between the patterns 130, or in other words there are different proportions of air between the patterns 130. It is also possible to vary $\Lambda 1$ and $\Lambda 2$ and the dimensions a1, a2 of the patterns 130 to vary the refractive index of the lens 1.

By sub-wavelength, what is meant is that the grating period $\Lambda 1$, $\Lambda 2$ is less than one quarter of one wavelength $\lambda$ of said range $\Delta 1$ of wavelengths $\lambda$. In one non-limiting example, the wavelength $\lambda$ in question is the shortest of the wavelengths in said range $\Delta 1$. Thus, $\Lambda 1 < \lambda / 4$ and $\Lambda 2 < \lambda / 4$. In one non-limiting embodiment, the grating period $\Lambda 1$, $\Lambda 2$ is less than one tenth of said wavelength $\lambda$. Thus, $\Lambda 1 < \lambda / 10$ and $\Lambda 2 < \lambda / 10$. It will be noted that this wavelength $\lambda$ is chosen from said range $\Delta 1$ and will be the one used in the formulas below.

As illustrated in FIG. 2, when a radar wave R1 is transmitted by the radar sensor 10 it travels to the lens 11, which has a thickness e0. The radar wave R1 strikes the lens 11 with an angle of incidence $\theta$ to which a refracted angle r corresponds. The radar wave R1 is reflected from the lens 11 and generates two reflected waves, one R11 of which is reflected from the outer face of the underlayer 12 of the lens 11 and the other of which from inside the lens 11. The two reflected waves R11 and R12 are reflected waves said to be of order 1, which return to the radar sensor 10. These are parasitic reflections. When the angle of incidence $\theta$ is different from 0°, the corresponding refracted angle r is also different from 0°. The phase difference $\Delta \varphi$, also called the phase shift $\Delta \varphi$, between these two reflected waves R11 and R12 is equal to:

$$\Delta \varphi = \frac{n_{eq} \delta}{\lambda} + \pi - \frac{2 e 0 t a \ (r) \sin(\theta)}{\lambda} \qquad \text{Math 1}$$

with:

$n_{eq}$ the equivalent refractive index of the underlayer 12 and the layer 13, −δ the path of the reflected wave R12 through the material, which is equal to 2e0/cos(r), nδ/λ the phase shift due to the trip through the material, π the phase shift due to internal reflection in the underlayer 12 and the layer 13 of patterns 130, ((2e0 tan(r) sin(θ))/λ) the phase shift in air due to the separation between the point of reflection Pt1 of the reflected wave R11 and the point of emergence Pt2 of the reflected wave R12.

As $\sin(\theta) = n_{eq} \times \sin(r)$, the following is obtained:

$$\frac{-2e0t\ (r)\sin(\theta)}{\lambda} = \frac{-2e0n_{eq}\sin(r)^2}{\lambda\cos(r)} \qquad \text{Math 2}$$

Namely:

$$\Delta\varphi = \pi + \frac{2n_{eq}e0}{\lambda\cos(r)}\left(1 - \sin(r)^2\right) = \pi + \frac{2n_{eq}e0\cos(r)}{\lambda} \qquad \text{Math 3}$$

whatever the value of the refracted angle r.

Given that the reflected waves R11 and R12 return in the direction of the radar sensor 10, they cause disruptions on the radar sensor 10, or in other words an attenuation of signal-to-noise ratio. In order to eliminate these disruptions, the total thickness e0 of the lens 11 will be defined so that the reflected waves R11 and R12 are in phase opposition, so as to create destructive interference. To obtain destructive interference, the phase difference Δφ between the two reflected waves R11 and R12 must be equal to π modulo 2π. Thus, it is necessary for Δφ=(2m+1)*π, with m a natural number. The following is therefore obtained:

$$(2m + 1)\pi = \pi + \frac{2n_{eq}e0\cos(r)}{\lambda} \qquad \text{Math 4}$$

Namely:

$$e0 = m\lambda/(2neq\cos(r)). \qquad 45$$

It will be noted that the equation e0=mλ/(2$n_{eq}$ cos(r)) is applied whatever the value of the angle r. Thus, this total thickness e0 is dimensioned so that it is equal to m times said wavelength λ divided by twice an equivalent refractive index $n_{eq}$ of the layer 13 of patterns 130 and of the underlayer 12, times the cosine of a refracted angle r corresponding to the angle of incidence θ of the radar waves R1, with m an integer. Thus, based on the equivalent refractive index $n_{eq}$ and on the wavelength λ used in the operating frequency range of the radar sensor 10, the total thickness e0 may be determined so that said reflected waves R11 and R12 cancel each other out. In one non-limiting embodiment, the wavelength used is the one located at the middle of the permitted range Δ1.

An ideal total thickness e0 is defined when the angle of incidence is equal to 0; and m is equal to 1. When θ=0, r=0. Consequently for m=1, the ideal total thickness e0 of the lens 11 is therefore e0=λ/(2$n_{eq}$). When r=0° then cos(r)=1.

In one non-limiting embodiment, the lens 11 has a total thickness e0 that is comprised between 0.8 and 1.2 times said ideal total thickness e0. This range of values takes into account the possible emission angles of the radar sensor 10. The possible values of the angle of incidence θ are defined in the technical specifications of the radar sensor 10, this meaning that the possible values of the angle of incidence θ are in the field of view FOV of the radar sensor 10. In one non-limiting example, the angle of incidence θ is comprised between 0° and +/−30°. This value range of 0.8 to 1.2 makes it possible to take into account manufacturing tolerances of the total thickness e0.

It will be noted that there is a value of the angle of incidence θ for which the reflected radar waves R11 and R12 cause maximum disruption at the receive antennas 101 of the radar sensor 10. This angle of incidence θ is called the critical angle of incidence θ. In one non-limiting embodiment, this value is equal to θ=arctan(d1/(2e4)), with d1 the distance between the transmit antenna 100 and the receive antennas 101, and e4 the distance between the radar sensor 10 and the lens 11, as illustrated in FIG. 2. It will be noted that, in a non-limiting example, the midpoint of the receive antennas 101 is considered when calculating d1.

Thus, depending on the value of the local refractive index n1 and on the wavelength λ used in the range of operating frequencies of the radar sensor 10 (between 76 GHz and 81 GHz in the non-limiting example given), it is possible to determine the value that the total thickness e0 must have for the reflected waves R11 and R12 of order 1 to cancel each other out. The reflected radar waves R11 and R12 are reflected from the lens 11 in a limited region. Thus, the receive antennas 101 see less noise. A better signal-to-noise ratio is obtained.

The lens 11 has a total thickness e0 formed by the height h1 of the patterns 130 and by the thickness e2 of the underlayer 12. To dimension the total thickness e0, the height h1 of the patterns 130 or the thickness e2 is adjusted so that e0=mλ/(2$n_{eq}$ cos(r)) for a given r. In one non-limiting embodiment, the given r corresponds to the critical angle of incidence θ.

The equivalent refractive index $n_{eq}$ is equal to:

$$n_{eq} = \frac{n_1 n_2(e_1 + e_2)}{n_2 e_1 + n_1 e_2} = \frac{n_1 n_2\left(1 + \dfrac{e_2}{e_1}\right)}{n_2 + n_1\left(\dfrac{e_2}{e_1}\right)} \qquad \text{Math 5}$$

with n1 the local refractive index of the layer 13 of patterns 130, n2 the refractive index of the underlayer 12, e1 the height h1 of the patterns 130, and e2 the thickness of the underlayer 12. It will be noted that n1 is dependent on the position of the local region Z1 of the patterns 130 on the layer 13 for which the calculation is performed. Thus, the equivalent refraction index $n_{eq}$ is dependent on the position of the local region Z1 on the layer 13.

It will be noted that the layer 13 of patterns 130 has a local refraction index n1 that is calculated depending on the local density $\tau_r$ of said patterns 130 in the layer 13. The local density $\tau_r$ at a point of the lens 11 is the weighted average of the fill factor $\tau_{r132}$ of each cell 132 located at a distance from the point in question smaller than a given value of the order of one of the wavelengths λ from the range Δ1 of wavelengths used. The local refractive index n1, also called the effective refractive index $n_{eff}$, is composed of two effective refractive indices $n_{effTE}$ and $n_{effTM}$ which depend on the polarization of the incident wave, namely the primary radar wave R1, and which may be expressed as a function of the local density $\tau_r$ (also called the fill factor $\tau_r$), which represents the percentage of material occupied by the medium of high refractive index n1, namely here the patterns 130, as opposed to the medium of low refractive index n0, namely here air. It will be noted that the local density $\tau_r$ represents the percentage of material occupied by the medium of high refractive index n1 in a region with a dimension of the order of one of the wavelengths $\lambda$ from the range $\Delta1$ of wavelengths used. Thus:

$$n_{effTE} = \sqrt{\varepsilon_{effTE}} = \sqrt{\tau_r \varepsilon_{max} + (1 - \tau_r)\varepsilon_{min}} \qquad \text{Math 6}$$

$$n_{effTM} = \sqrt{\varepsilon_{effTM}} = \frac{1}{\sqrt{\dfrac{\tau_r}{\varepsilon_{max}} + \dfrac{1 - \tau_r}{\varepsilon_{min}}}} \qquad \text{Math 7}$$

the term TE designating the polarization of the incident wave, namely here the radar wave R1 that strikes the lens 11, perpendicular to the plane of the substrate, namely the underlayer 12, TM designating the polarization parallel to the plane of the substrate, $\varepsilon_{max}$ designating the permittivity of the medium with the highest refractive index, namely the patterns 130, and $\varepsilon_{min}$ designating the permittivity of the medium with lowest refractive index, namely air here. In another non-limiting embodiment, air may be replaced by a plastic with a very low index.

It will be noted that, when the incident wave, here the radar wave R1, is irradiating the structured dielectric element, namely the lens 11, and has a wavelength $\lambda$ (in said range $\Delta1$) much larger than the repetition period $\Lambda1$, $\Lambda2$ of the structures 130 ($\lambda \gg \Lambda1$, and $\lambda \gg \Lambda2$), it is a question of a propagation regime called the static limit.

For two-dimensional structures 130 such as illustrated in FIG. 4, the effective refractive index $n_{eff2D}$ of a 2D structure may be approximated by the quadratic mean of the effective refractive indices of the two polarizations TM and TE in one dimension to the order 0, which corresponds to the static limit. The fill factor $\tau_{r132}$ of a unit cell 132 is in this particular case:

$$\tau_{r132} = \frac{a1.a2}{\Lambda1.\Lambda2} \qquad \text{Math 8}$$

and:

$$n_{eff2D} = \left[\frac{1}{2}\left(n_{effTE}^2 + n_{effTM}^2\right)\right]^{\frac{1}{2}} \qquad \text{Math 8}$$

In the more general case, for patterns 130 of any shape, with $\Lambda1$, $\Lambda2$ arbitrary, and with a unit cell 132 of rectangular base, the fill factor $\tau$r132 for a unit cell 132 will be:

$$\tau_{r132} = \frac{V132}{\Lambda1.\Lambda2.h\,\text{max}} \qquad \text{Math 9}$$

this corresponding to a ratio of the volume of material ($V_{132}$) in the unit cell 132 to an empty bounding volume ($\Lambda1 \Lambda2 hmax$), with hmax the maximum height of the pattern 130 in the unit cell 132 (i.e. the highest height in the pattern 130), and $$V_{132} = \int_0^{hmax} \int_{X132}^{X132+\Lambda1} \int_{Y132}^{Y132+\Lambda2} M(X, Y, Z)dXdYdZ \qquad \text{Math 10}$$

with ($X_{132}$, $Y_{132}$, 0), the coordinates of a corner C1 of the unit cell 132 and M(X, Y, Z)=1 if the point of coordinates (X, Y, Z) is located in material and M(X, Y, Z)=0 if not, i.e. the point of coordinates (X, Y, Z) is located in air. It will be noted that, when located in material, the point is located in the pattern 130 of the unit cell 132, and, when located in air, the point may potentially be located inside a pattern 130 (since a pattern 130 may in fact contain air holes in one non-limiting example). It will be noted that, in the non-limiting example of FIG. 4, hmax=h1 described above.

It will be noted that this formula for volume of material $V_{132}$ is valid for any unit cell 132 of rectangular base, whatever the shape of the pattern 130 in said unit cell 132. Thus, as $\Lambda1$ and $\Lambda2$ may change from one unit cell 132 to another unit cell 132, and as the maximum height hmax may change from one pattern 130 to another pattern 130, each unit cell 132 may contain a different volume of material and therefore have a different fill factor $\tau_{r132}$. To get the fill factor $\tau_r$ of the entire layer 13 of patterns 130 at a given point of the lens 11, a weighted average of the fill factors $\tau_{r132}$ of each cell 132 located at a distance from the point in question on the lens 11 smaller than a given value of the order of one of the wavelengths $\lambda$ of the range $\Delta1$ of wavelengths used is calculated. This definition is valid for all the points of the lens 11. In one non-limiting embodiment, the points belong to the surface of the underlayer 12 of coordinate Z=0. Thus:

$$\tau_r = \frac{\sum_n \Lambda1_n.\Lambda2_n.h\,\text{max}_n.\tau_{rn}}{\sum_n \Lambda1_n.\Lambda2_n.h\,\text{max}\,n} \qquad \text{Math 11}$$

where n designates any one of the unit cells 132 located at a distance from the point in question on the lens 11 smaller than a given value of the order of one of the wavelengths $\lambda$ of the range $\Delta1$ of wavelengths used.

It will be noted that to produce the lens 11, low-cost injection-molding manufacturing technologies are used by way of manufacturing method. In particular, the underlayer 12 and the layer 13 of patterns 130 are made of the same material and injection-molded simultaneously, this greatly reducing the manufacturing cost. Additive manufacturing technologies, also called 3D printing, may also be used by way of manufacturing method.

Of course the description of the invention is not limited to the embodiments described above and to the field described above. Thus, in another non-limiting embodiment, the radar sensor 10 comprises more than one transmit antenna 100 and more than two receive antennas 101.

Thus, the described invention in particular has the following advantages:

it makes it possible not to reduce the range of the radar sensor 10;

it makes it possible to reduce the bulk of the vehicle assembly 1, by replacing a curved lens with a flat lens;

it makes it possible to reduce the cost and the weight of the vehicle assembly 1, by replacing a curved lens with a flat lens;

by replacing a curved lens with a flat lens, it makes it possible to considerably reduce the absorption of some of the radar waves R1 transmitted by the radar sensor 10;

it makes it possible, just like a curved lens, to adapt the field of view of the radar sensor 10 to the demands of manufacturers;

it makes it possible to suppress the reflected waves R11, R12 of order 1 reflected in the direction of the radar sensor 10. The signal-to-noise ratio of said radar sensor 10 is thus no longer low.

The invention claimed is:

1. A vehicle assembly for a vehicle comprising:

a radar sensor having a field of view and configured to transmit radar waves in a range of wavelengths into the field of view;

a lens placed facing the radar sensor;

wherein the lens is a gradient-index lens type and includes an underlayer and a layer of patterns forming a sub-wavelength structured dielectric element having a repetition period of the patterns being less than one quarter of one wavelength of the range of the wavelengths, and the layer of the patterns possessing a local refractive index that is calculated dependent on a local density in the layer of the patterns;

wherein the lens has a total thickness formed by a height of the layer of the patterns and by a thickness of the underlayer;

the total thickness being dimensioned such that the total thickness is equal to "m" times the one wavelength divided by twice an equivalent refractive index of the layer of the patterns and the underlayer times a cosine of a refracted angle corresponding to an angle of incidence of the radar waves, where "m" is a positive integer number;

wherein the total thickness is defined by an angle of incidence equal to arctan (d1/2*e4);

wherein e4 represents a distance between the radar sensor and the lens and wherein d1 represents a distance between a transmit antenna and a receive antenna of the radar sensor.

2. The vehicle assembly of claim 1, wherein the radar sensor is a millimeter waves or hyper frequency waves or microwaves radar sensor.

3. The vehicle assembly of claim 1, wherein the radar waves are transmitted in a frequency band comprised between 100 MHz and 5 GHz.

4. The vehicle assembly of claim 1, wherein the repetition period of the patterns is less than one tenth of the one wavelength.

5. The vehicle assembly of claim 1, wherein the lens is composed of a plurality of unit cells, each unit cell including one pattern and the local density of the patterns in a layer at a given point of the lens is equal to a weighted average of all fill factors obtained for each unit cell.

6. The vehicle assembly of claim 1, wherein the local density is equal to a width times a length of an applicable pattern shape, where the applicable pattern shape is dependent on a shape having a length dimension and a width dimension; the whole divided by the repetition period of the patterns.

7. The vehicle assembly of claim 1, wherein the local refractive index is composed of two effective refractive indices dependent on the local density, a permittivity of the patterns, and a permittivity of air between the layer of the patterns and the underlayer.

8. The vehicle assembly of claim 1, wherein the patterns are cylindrical prisms, or rectangular prisms, or pyramidal prisms, or cubic prisms, or segments of tori.

9. The vehicle assembly of claim 1, wherein a pattern within each unit cell has dimensions of within 0.4 mm.

10. The vehicle assembly of claim 1, where if the angle of incidence is equal to zero, then the total thickness is equal to the one wavelength divided by twice the equivalent refractive index.

11. A gradient-index lens configured to adapt a field of view of a radar sensor of a vehicle configured to transmit radar waves, the gradient-index lens being placed facing the radar sensor, comprising:

an underlayer and a layer of patterns forming a sub-wavelength structured dielectric element;

a repetition period being less than one quarter of one wavelength from a range of wavelengths that the radar waves are transmitted;

the layer of the patterns that possesses a local refractive index based on a local density of layer of the patterns;

wherein the gradient-index lens has a total thickness formed by a height of the layer of the patterns and by a thickness of the underlayer;

the total thickness being equal to "m" times the one wavelength divided by twice an equivalent refractive index of the layer of the patterns and with the underlayer times a cosine of a refracted angle corresponding to an angle of incidence of the radar waves, where "m" is a positive integer number;

wherein the total thickness is defined by an angle of incidence equal to arctan (d1/(2*e4));

wherein e4 represents a distance between the radar sensor and the gradient-index lens, and wherein d1 represents a distance between a transmit antenna and a receive antenna of the radar sensor.

* * * * *